United States Patent [19]
Ong

[11] Patent Number: 5,840,790
[45] Date of Patent: Nov. 24, 1998

[54] PRESERVATION AND ENHANCED STABILIZATION OF LATEX

[75] Inventor: Chong Oon Ong, Petaling Jaya, Malaysia

[73] Assignee: RXD Corporation SDN BHD, Petaling Jaya, Malaysia

[21] Appl. No.: 652,139

[22] Filed: May 23, 1996

Related U.S. Application Data

[63] Continuation of Ser. No. 337,379, Nov. 8, 1994, abandoned.

[30] Foreign Application Priority Data

Nov. 9, 1993 [MY] Malaysia .......................... PI 930 2344

[51] Int. Cl.$^6$ ...................................... C08K 5/17
[52] U.S. Cl. ........................................... 524/186; 524/432
[58] Field of Search ...................... 524/186, 432

[56] References Cited

U.S. PATENT DOCUMENTS

| | | | |
|---|---|---|---|
| 3,671,478 | 6/1972 | Doyle et al. | 525/134 |
| 4,062,906 | 12/1977 | Knight . | |
| 5,158,805 | 10/1992 | Preussmann et al. | 427/220 |

FOREIGN PATENT DOCUMENTS

| | | |
|---|---|---|
| 663703 | 5/1979 | U.S.S.R. . |
| 271863 | 6/1928 | United Kingdom . |
| 271863 | 8/1929 | United Kingdom . |
| 661637 | 11/1951 | United Kingdom . |
| 854128 | 11/1960 | United Kingdom . |
| 856055 | 12/1960 | United Kingdom . |
| 865055 | 12/1960 | United Kingdom . |
| 965757 | 8/1964 | United Kingdom . |

OTHER PUBLICATIONS

Sax, N. Irving, ed., Hawley's Condensed Chemical Dictionary, 11th edition, New York, pp. 1151–1152, 1987.

*Primary Examiner*—Bernard Lipman
*Attorney, Agent, or Firm*—Jacobson, Price, Holman & Stern, PLLC

[57] ABSTRACT

There is disclosed a preservative system for natural rubber latex comprising adding an organic amine or mixture of two or more amines to the latex. Other bactericides may also be added to assist in preserving the latex. The other bactericides include TMTD and ZnO, particularly as a 1:1 dispersion. Also described is a method of improving or enhancing the stability of the latex by adding the organic amines. Advantages of using organic amines as the preservative include less fumes of ammonia being emitted, a wide range of dosages are possible, the amount of TMTD and/or ZnO in the latex can be reduced to increase the stability of the latex and to reduce the amount or carcinogenic materials in the latex.

22 Claims, No Drawings

PRESERVATION AND ENHANCED STABILIZATION OF LATEX

This is a Continuation of application Ser. No. 08/337,379, filed Nov. 8, 1994 which was abandoned upon the filing hereof.

We, THE RXD CORPORATION SDN. BHD. 78A, Jalan SS 24/2 Taman Megah 47301, Petaling Jaya, Selangor, Malaysia, do hereby declare the invention for which we pray that a Patent may be granted to us, and the method by which it is to be performed, to be particularly described in and by the following statement:

This invention relates generally to the preservation of natural rubber latex obtained from Hevea rubber trees. In particular, the present invention relates to the use of organic amines in methods for the preservation of the natural latex, in whatever form the latex may take such as field latex, concentrated latex, latex compound, modified latex and finished rubber product. More particularly, the present invention relates to the use of organic amines either by themselves or in combination with other bactericides to preserve the latex. Additionally, the present invention relates to methods of improving the stability of latices and of products made therefrom by adding one or more organic amines.

Although the present invention will be described with particular reference to the use of one or more organic amines by themselves or in combination with one or more other bactericides, it is to be noted that the scope of the present invention is not limited to the described embodiments but rather the scope of the invention is more extensive so as to include the use of other organic amines than those specifically described, the use of other bactericides than those specifically described, the use of other combinations of organic amines and bactericides than specifically described, and for the preservation of materials other than those specifically described.

Natural rubber latex obtained as field latex usually has a solids content of from 25 to 45% and is normally preserved against deterioration and coagulation by addition of ammonia either alone or in combination with other bactericides. The preserved field latex containing the ammonia and optionally other bactericides is then centrifuged or creamed to produce concentrated latex. The concentrated latex is also preserved against deterioration and coagulation by addition of further ammonia either alone or in combination with other bactericides. The concentrated latex may be formed into a latex compound by the addition of other chemical additives or by undergoing other processes or may be modified by the addition of or reaction with other chemical additives or by undergoing further processing.

For the preservation of field latex, ammonia is normally added at levels of 0.3 to 0.8% by weight based on the weight of latex, depending on such things as the length of time preservation is required, the condition of the latex when the ammonia is added, and the like. When used in combination with other bactericides, such as for example, tetramethylthiuram disulphide (TMTD), zinc oxide (ZnO) and the like, the dosage of ammonia added to preserve the latex can be reduced to 0.2 to 0.5% by weight based on the weight of latex. However, the use of ammonia either alone or in combination with other preservatives in the preservation of the latex presents one or more disadvantages. One of the disadvantages arises when the preserved latex containing ammonia is processed in a centrifuge or is creamed since ammonia fumes are emitted which pollute or Otherwise adversely affect the environment. The emission of the ammonia fumes makes the working environment in the vicinity of the centrifuge or creamer and related areas of the plant or factory processing the rubber latex very unpleasant for workers or other personnel and may indeed be injurious or very hazardous to the health of the workers and other personnel. Another problem arising from the emission of ammonia fumes relates to corrosion of factory buildings and roofs in close proximity to the centrifuge or creamer. In extreme cases the corrosion can b e severe. Thus, there is a need to reduce or eliminate the amount of ammonia fumes emitted during centrifuging or creaming of the preserved field latex.

After centrifugation or creaming to concentrate the latex, the concentrated latex is then preserved by further additions of ammonia, usually at 0.60 to 0.75% weight based on the weight of latex, if used alone to produce what is called high ammonia (HA) latex or at 0.15 to 0.25% if used in combination with secondary bactericides to produce low is ammonia (LA) latex. Again further addition of ammonia results in further emission of ammonia fumes to the factory in which the latest is being processed.

The problems of using ammonia also exist in relation to the processing of the concentrated latex. Concentrated latex, preserved with high dosages of ammonia, pollutes the working environment by emitting ammonia during processing at the converters, factories where the concentrated natural latex is converted to rubber products. This aerial pollution can be particularly objectionable during the colder months of the year when the factory building is more enclosed. Thus, this is a further contributing reason for eliminating or at least reducing the amount of ammonia emissions in the workplace when processing latex.

Another problem of using existing preservatives, particularly zinc oxide, is t hat in some circumstances the zinc oxide destroys the stability of or destabilises latex since the latex has a tendency to thicken when zinc oxide is present. Thus, another aspect of the present invention is to add organic amines to the latex to overcome the problems of destability brought about by the inclusion of or retention within the latex of zinc oxide.

Another problem associated with the use of some bactericides, such as TMTD, is that the TMTD is known to produce carcinogenic nitrosoamines in the latex system. Additionally, TMTD can cause discolouration in latex products. Therefore, in some instances it is desirable to reduce or eliminate the amount of TMTD added to latex.

It is an aim of the present invention to provide a method of preserving latex in which one or more organic amines either alone or in combination with one or more bactericides are used to preserve field and concentrated latex so that the amount of ammonia emitted during processing of the latex is eliminated or at least reduced, It is another aim of the present invention to provide a method of increasing the stability of a latex by adding one or more organic amines to the latex, particularly if other bactericides or preservatives, in particular zinc oxide, have been added to the latex, or are to be added to the latex. It is a further aim of the present invention to reduce or eliminate the amount of other bactericide, notably TMTD and ZnO added to the latex, particularly in latex used to produce latex products for use with humans and animals.

According to a first aspect of the present invention there is provided a process for preserving a latex comprising adding to the latex one or more organic amines.

According to another aspect of the present invention there is provided a method of maintaining or enhancing the stability of a latex comprising adding to the latex one or more organic amines. Typically, the latex to which the amine is added is a field latex, a concentrated latex, a latex compound, a modified latex or a rubber product made from one or more of these latices.

Typically, a single organic amine or a mixture of one or more organic amines are used. More typically, the organic amine or mixture of organic amines are generally less volatile than ammonia. Even more typically, the organic amine is ethanolamine (2-aminoethanol), ethylamine, isopropanol amine (1-amino propanol), ethylene amine, ethylene triamine, or the like. It is to be noted that any suitable organic amine may be used in the process of the present invention.

Typically, one embodiment of the method of the present invention comprises adding the amine or amines in combination with other bactericides. The other bactericides useful in the present invention include tetramethylthiuram disulphide (TMTD), zinc oxide (ZnO), sodium diethyl dithiocarbamate (SBDC), Proxel CRL and the like. However, it is to be noted that any suitable bactericide may be used. In this embodiment, the amount of organic amine added to the latex can be reduced due to the presence of the other bactericide in the latex, or can be increased if no other bactericide is present.

Typically, the organic amine or mixture of amines is used in an amount of up to 1.5% or higher, preferably 0.1 to 1.5% by weight based on the weight of the latex, especially when the organic amine is used alone, or if the organic amine is used in combination with the other bactericides the amount of organic amine is from 0.1 to 0.5% and preferably 0.15 to 0.5%. Thus, lower dosages of organic amine can be used when the amine and other bactericide are used in combination whereas higher dosages are required if the organic amine or amines are used alone.

Typically, lower dosages of amines can be used with field latex which requires preservation for a lesser time than the concentrated latex or other forms of latex.

Typically, the other bactericide, if present, is in an amount of 0.02 to 0.05% by weight based on the weight of latex, preferably 0.025 to 0.05%. More typically, TMTD and zinc oxide are used in a dispersion as the other bactericide. The dispersion can range over a wide range of amounts with a preferred range being from 2.1 to 1:2 TMTD to ZnO and a preferred range being from 1:1 TMTD to ZnO.

Typically, a small quantity, preferably from 0.03 to 0.10%, of fatty acid soap, such as for example ammonium laurate or similar, is added to the latex along with the amine or amines and optionally the other bactericides.

Typically, the organic amine or amines may be added simultaneously with each other or separately. More typically, the amine or mines are added before, simultaneously with or after the other bactericides. More typically, the amines may be added at any stage in the production of or processing of the latex, ouch as for example, to the field latex, to the concentrated latex, to the compounded latex, to the modified latex or to the product made from the latex.

The use of an organic amine or mixture of organic amines which are less volatile than ammonia avoids the adverse effects produced by using ammonia as the preservative.

Typically, in the case of the combined use of amine and other bactericide, the organic amine is preferably ethanolamine which has the chemical name 2-aminoethanol and the structure $HOCH_2CH_2NH_2$ or ethylamine having the structure $CH_3CH_2NH_2$.

Typically, if the amine is to be used alone the organic amine is preferably 2-amino ethanol, ethylamine, isopropanolamine, ethyl diamine or diethyl triamine.

Typically, ethanolamine or ethylamine is added in an amount of 0.15 to 0.50%, preferably 0.2% or 0.3%, in combination with 0.025 to 0.05% of a 50:50 dispersion of a TMTD and zinc oxide for preserving concentrated latex. More preferably, 0.2% of amine(s) are added if the latex is a field latex.

Typically, when the latex or rubber product made from the latex is to be used by or with animals, including humans, the amount of TMTD is reduced or entirely eliminated, and thus larger dosages of organic amines are used.

Typically, when zinc oxide is present or is to be added to the latex, the inclusion of the organic amines overcomes the destabilising effect of the ZnO.

The present invention will now be described by way of example in which the following examples illustrate aspects of the present invention. Percentages and parts herein are all expressed as weight based on the weight of the whole rubber latex.

TABLE 1

| Preservative System | VFA No. after Storage | | |
|---|---|---|---|
| | 1 day | 3 days | 5 days |
| 1. Ethanolamine | | | |
| 0.3% | 0.168 | Latex coagulated | Latex coagulated |
| 0.5% | 0.042 | 0.063 | 0.458 |
| 1% | 0.028 | 0.045 | 0.054 |
| 1.5% | 0.035 | 0.045 | 0.115 |
| 0.2% + TMTD/ZnO 0.05% | 0.028 | 0.042 | 0.056 |
| 2. Ethylamine | | | |
| 0.3% | 0.028 | 0.052 | 0.094 |
| 0.5% | 0.024 | 0.031 | 0.031 |
| 1% | 0.024 | 0.028 | 0.052 |
| 1.5% | 0.024 | 0.024 | 0.024 |
| 0.2% + TMTD/ZnO 0.05% | 0.021 | 0.028 | 0.031 |
| 3. Isopropanolamine | | | |
| 0.3% | 0.045 | Latex coagulated | Latex coagulated |
| 0.5% | 0.045 | 0.059 | 0.129 |
| 1% | 0.028 | 0.049 | 0.056 |
| 1.5% | 0.035 | 0.038 | 0.042 |
| 0.2% + TMTD/ZnO 0.05% | 0.024 | 0.035 | 0.035 |
| 4. Ethylene Diamine | | | |
| 0.3% | 0.045 | 0.070 | 0.105 |
| 0.5% | 0.031 | 0.045 | 0.094 |
| 1% | 0.017 | 0.021 | 0.028 |
| 1.5% | 0.021 | 0.017 | 0.021 |
| 5. Diethylene Triamine | | | |
| 0.3% | 0.031 | 0.664 | Latex coagulated |
| 0.5% | 0.035 | 0.049 | 0.056 |
| 1% | 0.024 | 0.024 | 0.042 |
| 1.5% | 0.038 | 0.035 | 0.035 |

EXAMPLE 1

Bulked field latex was divided into various portions and treated with various dosages of organic amines, e.g. ethanolamine, ethylamine, isopropanolamine, ethylene diamine and diethylene triamine, and also with a combination of the organic amine and a bactericide, e.g. TMTD/ZnO.

The treated latices are left to stand at ambient temperature and the VFA (volatile fatty acid) number of the treated latex was determined periodically. The VFA number was determined in accordance with standard tests and is a measure of the amount of deterioration or putrefaction of the latex whereby the lower the VFA number, the lower the degree of putrefaction.

The results shown in Table 1 show clearly that an organic amine, when used by itself, can preserve field latex, particularly when relatively higher dosages of from 0.5% to 1.5% by weight of the amine are used. The dosage required for adequate preservation will depend on the duration of storage required. Latex preserved by using the organic amines in accordance with the present invention can be stored for several days without deterioration and without adversely affecting the processing characteristics of the field latex.

EXAMPLE 2

Bulked field latex was adequately preserved with ethanolamine before being centrifuged. The concentrated latex was then divided into various portions. These portions were treated with various dosages of ethanolamine. This was repeated for isopropanolamine. These were also compared with concentrated latex treated with the organic amine (ethanolamine and isopropanolamine, respectively) used in combination with TMTD/ZnO. Further portions of the concentrated latex were treated with ammonium laurate to improve the development of MST (mechanical stability time) in some of the treated concentrated latex. MST is a measure of the stability of the latex to mechanical actions. The higher the MST number, the more stable is the latex to mechanical actions.

The treated latex was tested initially and after two months' storage for each of the properties as indicated in Tables 2a and 2b below. The results of these tables show that the organic amines, on their own, can preserve the concentrated latex during storage.

Also, the values obtained for the tests conducted to establish ZST (zinc oxide stability time) and the ZOV (zinc oxide viscosity) clearly shown that the use of the organic amine to preserve concentrated latex also increases the stability of the treated latex when zinc oxide dispersion is added to the latex, and thus, the amines can be used to improve the stability of the latex, particularly if the latex contains ZnO or ZnO has been added to the latex previously. It is to be noted that the inclusion of ZnO has a tendency to destroy or destabilise the latex. ZST is a measure of the mechanical stability of the latex after the addition of a specified amount of zinc oxide. ZOV is a measure of the viscosity of a latex after the addition of a specified amount of zinc oxide.

TABLE 2a

| | | Latex Tests | | | | | |
|---|---|---|---|---|---|---|---|
| Preservative System | Storage Time | VFA No. | KOH No. | MST s | ZST s | ZOV cps | Viscosity cps |
| 1. Ethanolamine 0.7% | 1 day | 0.01 | 0.46 | 70 | 60 | 52.5 | — |
| | 2 mths | 0.02 | 0.60 | 225 | 1120 | 56 | 79 |
| 2. Ethanolamine 1.0% | 1 day | 0.01 | 0.47 | 65 | 50 | 53 | — |
| | 2 mths | 0.02 | 0.61 | 220 | 1260 | 58.5 | 86 |
| 3. Ethanolamine 1.5% | 1 day | 0.01 | 0.49 | 65 | 50 | 52.5 | — |
| | 2 mths | 0.02 | 0.62 | 210 | 1355 | 60 | 83 |
| 4. Ethanolamine 0.2% + TMTD/ZnO 0.025% + Ammonium Laurate 0.05% | 1 day | 0.01 | 0.44 | 65 | 60 | 53.5 | — |
| | 2 mths | 0.02 | 0.60 | 625 | 1310 | 62.5 | coagulated |
| 5. Ethanolamine 0.3% + TMTD/ZnO 0.025% + Ammonium Laurate 0.05% | 1 day | 0.01 | 0.46 | 140 | 70 | 53.5 | — |
| | 2 mths | 0.02 | 0.59 | 820 | 1885 | 52 | 72 |
| 6. Ethanolamine 0.4% + TMTD/ZnO 0.025% + Ammontum Laurate 0.05% | 1 day | 0.02 | 0.52 | 640 | 365 | 52.5 | — |
| | 2 mths | 0.02 | 0.60 | 1110 | 2140 | 51 | 67 |

TABLE 2b

| | | Latex Tests | | | | | |
|---|---|---|---|---|---|---|---|
| Preservative System | Storage Time | VFA No. | KOH No. | MST s | ZST s | ZOV cps | Viscosity cps |
| 1. Isoprapanolamine 0.7% | 1 day | 0.01 | 0.46 | 40 | 40 | 48.5 | — |
| | 2 mths | 0.04 | 0.64 | 80 | 680 | 60.5 | 80 |
| 2. Isopropanolamine 1.0% | 1 day | 0.01 | 0.42 | 40 | 40 | 49 | — |
| | 2 mths | 0.04 | 0.62 | 90 | 830 | 62.5 | 76 |
| 3. Isopropanolamine 1.5% | 1 day | 0.02 | 0.46 | 55 | 45 | 50 | — |
| | 2 mths | 0.04 | 0.63 | 125 | 1185 | 62.5 | 81 |
| 4. Isopropanolamine 0.3% + TMTD/ZnO 0.025% + Ammonium Laurate 0.05% | 1 day | 0.01 | 0.46 | 90 | 70 | 46.5 | — |
| | 2 mths | 0.02 | 0.61 | 230 | 680 | 54 | 90 |
| 5. Isopeopanolamine 0.4% + TMTD/ZnO 0.025% + Ammonium Laurite 0.05% | 1 day | 0.01 | 0.48 | 80 | 70 | 47.5 | — |
| | 2 mths | 0.03 | 0.64 | 190 | 700 | 53.5 | 83 |

EXAMPLE 3

Bulked field latex was divided into four portions and treated with various combinations of ethanolamine and ethylamine as the organic amine component and TMTD, ZnO and sodium diethyl dithiocarbamate (SBDC) as the bactericide component in differing amounts as shown in Table 1. The organic amine component was added as a liquid. The bactericides component was added as a dispersion of a 1:1 blend of the bactericide and zinc oxide. The treated latices were then left to stand at ambient temperature and the VFA (volatile tatty acid) number of the treated latex was determined after 1 and 3 days of storage. The results shown in Table 3 show clearly that the composite systems using the combination of organic amine or mixture of organic amines and various bactericides can preserve field latex for several days at least.

TABLE 3

| Preservation System | VFA No. after storage | |
|---|---|---|
| | 1 day | 3 days |
| Ammonia 0.2% + TMTD/ZnO 0.025% | 0.021 | 0.021 |
| Ethanolamine 0.2% + TMTD/ZnO 0.05% | 0.021 | 0.029 |
| Ethanolamine 0.2% + SBDC/ZnO 0.05% | 0.042 | 0.067 |
| Ethylamine 0.2% + TMTD/ZnO 0.05% | 0.038 | 0.038 |
| Isopropanolamine 0.2% + TMTD/ZnO 0.05% | 0.024 | 0.035 |

EXAMPLE 4

Bulked field latex was preserved with a combination of 0.2% ethanolamine and 0.05% TMTD/ZnO dispersion. The field

TABLE 4

| Latex | Ethanolamine | Ethylamine | TMTD/ZnO | Proxel/ZnO | SBDC/Zno | KOH |
|---|---|---|---|---|---|---|
| A | 0.2 | | 0.025 | | | |
| B | 0.3 | | 0.025 | | | |
| C | 0.2 | | | 0.05 | | |
| D | 0.2 | | 0.025 | | | 0.05 |
| E | 0.3 | | | | 0.05 | |
| F | | 0.3 | 0.025 | | | |

| Latex | Test | Storage time in days | |
|---|---|---|---|
| | | 1 | 30 |
| A | VFA | 0.02 | 0.022 |
| | MST | 30 | 130 |
| B | VFA | 0.02 | 0.022 |
| | MST | 30 | 150 |
| C | VFA | 0.022 | 0.020 |
| | MST | 30 | 380 |
| D | VFA | 0.020 | 0.022 |
| | MST | 30 | 170 |
| E | VFA | 0.024 | 0.031 |
| | MST | 30 | 220 |
| F | VFA | 0.018 | 0.026 |
| | MST | 30 | 110 | latex was then centrifuged to produce concentrated latex. The resultant latex concentrate was then divided into six portions. These portions were treated with various combinations of ethanolamine and ethylamine as the organic amine component and TMTD, zinc oxide, Proxel CRL and SBDC as the bactericide component as shown in Table 4. The various portions of the treated latex were tested for VFA number and MST (mechanical stability time) after storing for 1 day and 30 days. The results shown in Table 4 clearly demonstrate that the use of combinations of organic amine or amine and the various bactericides can preserve concentrated latex against deterioration for at least up to 30 days.

Advantages of the Present Invention

The use of an organic amino in methods of preserving latex or maintaining or restoring the stability of the latex, in field, concentrated, modified or compounded forms has several advantages over the use of ammonia; these advantages include the following:

a) Being a liquid, an organic amino or amines can be readily conveyed and measured and are generally easy to use.

b) As the organic amine or mixture of organic amines are not very volatile at ambient temperatures there is a reduction in the amount of fumes emitted during processing of latex.

c) The handling and processing of field and concentrated latex preserved with an organic amine with or without the bactericides do not pollute the working environment, thereby making it pleasant to work in and less hazardous to health.

d) The use in manufacturing operations of concentrated latex preserved with an organic amine and bactericides, does not pollute the air in the work environment. Its use therefore makes the workplace more pleasant to work in and less hazardous to health.

e) Lesser amounts of organic amine or amines can be employed in combination with other bactericides to effectively preserve the latex, f) The use of organic amines also has the benefit of overcoming or countering the adverse effects of ZnO on the stability of the latex, whatever for it is in, whereby ZnO tends to thicken the latex and hence increase the viscosity.

g) In latex or rubber products which are used in connection with animals, the use of organic amines alone in sufficient dosages overcomes the need to use TMTD as an additional bactericide or reduces the amount of TMTD which in turn reduces or eliminates the production of nitrosoamines in the latex or rubber product and reduces or eliminates any discolouration or variation in the rate of cure of the latex.

What is claimed is:

1. A method for preserving a natural rubber in a colloidal system comprising the steps of:
adding at least one primary aliphatic amine and at least one bactericide, as an aqueous dispersion, to a natural rubber latex, wherein said method avoids the need for adding ammonia to preserve said latex.

2. The method of claim 1 wherein the at least one primary aliphatic amine is selected from the group consisting of ethanolamine, ethylamine, isopropanolamine, ethylenediamine, and diethylenetriamine.

3. The method of claim 1 wherein the bactericide is selected from the group consisting of TMTD, zinc oxide, and sodium diethyl dithiocarbamate.

4. The method of claim 1 wherein the at least one bactericide is a 1:2 to 2:1 dispersion of TMTD and zinc oxide.

5. The method of claim 1 wherein the at least one bactericide is a 1:1 dispersion of TMTD and zinc oxide.

6. The method of claim 1 wherein the at least one amine added is in an amount of from 0.1 to 0.5 weight percent of the latex.

7. The method of claim 1 wherein when more than one amine is added the amines are added separately or simultaneously.

8. The method of claim 1 wherein the at least one amine is added before, after, or simultaneously with, the addition of the at least one bactericide.

9. The method of claim 1 wherein the natural rubber latex is obtained from an Hevea rubber tree.

10. The method of claim 9 wherein the natural rubber latex is selected from the group consisting of field latex and concentrated latex.

11. The method of claim 1 wherein an amount of from 0.10 to 0.5 weight percent of the at least one amine and an amount of from 0.02 to 0.05 weight percent of the at least one bactericide are added to the latex and the at least one bactericide is a 1:1 dispersion of TMTD and zinc oxide.

12. The method of claim 1 wherein the addition of the at least one primary aliphatic amine and the at least one bactericide avoids air pollution otherwise associated with the ammonia method of treating latex.

13. The method of claim 1, wherein the latex is a field latex and the method further comprises:
concentrating the field latex by way of centrifugation or creaming the latex.

14. The method of claim 13 wherein the at least one amine and the at least one bactericide are added to the concentrated latex.

15. The method of claim 1, wherein the latex is a field latex and the method further comprises:
concentrating the latex by way of centrifugation or creaming; and
adding 0.10 to 0.5 weight percent of the at least one amine in combination with 0.025 to 0.05 weight percent of the at least one bactericide, the bactericide being a 1:1 dispersion of TMTD and zinc oxide, to the concentrated field latex.

16. The method of claim 15 further comprising adding a fatty acid soap to the concentrated latex.

17. The method of claim 16 wherein the amount of the fatty acid soap added to the concentrated latex is 0.03 to 0.10 weight percent of the latex.

18. The method of claim 16 wherein the fatty acid soap is ammonium laureate.

19. The method of claim 1 wherein the at least one amine added is in an amount of about 0.2–0.5 weight percent of the latex.

20. The method of claim 1 wherein the latex is concentrated latex and is preserved for at least 30 days.

21. A method of preserving latex comprising the steps of:
concentrating a natural rubber latex, in a colloidal system, by way of centrifugation or creaming of the latex; and
adding to the concentrated latex, from 0.1 to 0.5% of at least one primary aliphatic amine selected from the group consisting of ethanolamine, ethylamine, isopropanolamine, ethylenediamine, and diethylenetriamine and from 0.02 to 0.05% of a 1:2 to 2:1 dispersion of TMTD and zinc oxide, wherein the percentages are by weight of the latex, and said method avoids the need for adding ammonia to preserve said latex.

22. The method of claim 21 wherein the latex is concentrated latex and is preserved for at least 30 days.

* * * * *

UNITED STATES PATENT AND TRADEMARK OFFICE
CERTIFICATE OF CORRECTION

PATENT NO. : 5,840,790
DATED : November 24, 1998
INVENTOR(S) : Chong Oon ONG

It is certified that error appears in the above-indentified patent and that said Letters Patent is hereby corrected as shown below:

Claim 1, line 1, after rubber, insert --latex--.

Signed and Sealed this

Thirteenth Day of July, 1999

Attest:

Q. TODD DICKINSON

Attesting Officer

Acting Commissioner of Patents and Trademarks